United States Patent [19]

Meurer

[11] 3,818,614

[45] June 25, 1974

[54] APPARATUS FOR DEMONSTRATING THE CRITICAL TEMPERATURE OF A FLUID

[75] Inventor: Engelbert Meurer, Bensberg-Moitzfeld, Germany

[73] Assignee: Leybold-Heraeus-Verwaltung GmbH, Cologne Bayental, Germany

[22] Filed: Mar. 30, 1972

[21] Appl. No.: 239,600

[30] Foreign Application Priority Data
Mar. 30, 1971 Germany............................ 2115360

[52] U.S. Cl. ................................. 35/19 R, 73/17 A
[51] Int. Cl. ........................................... G09b 23/12
[58] Field of Search ............. 73/17 A, 36, 53, 61.3, 73/440, 49.8, 323, 326, 328, 330, 331, 17 R, 19 R; 35/19 R

[56] References Cited
UNITED STATES PATENTS

| | | | |
|---|---|---|---|
| 1,250,664 | 12/1917 | Ronk | 73/323 |
| 1,355,554 | 12/1920 | Harrison | 73/36 |
| 1,737,126 | 11/1929 | Reyling et al. | 73/323 X |
| 1,939,776 | 12/1933 | Holmes et al. | 35/19 R |
| 2,752,725 | 7/1956 | Unsworth | 35/19 R X |
| 2,966,055 | 12/1960 | Tracht et al. | 73/17 A |
| 3,125,882 | 3/1964 | Johnson et al. | 73/331 |
| 3,184,971 | 5/1965 | Piasecki | 73/330 X |
| 3,215,166 | 11/1965 | Meinecke | 73/49.8 X |
| 3,250,022 | 5/1966 | Midgley | 35/19 R |
| 3,479,859 | 11/1969 | Hager | 73/17 A |
| 3,621,706 | 11/1971 | Markey | 73/17 A |

FOREIGN PATENTS OR APPLICATIONS 297,167 9/1928 Great Britain ........................ 73/440

Primary Examiner—Richard C. Queisser
Assistant Examiner—Daniel M. Yasich
Attorney, Agent, or Firm—Spencer & Kaye

[57] ABSTRACT

An apparatus for demonstrating the critical temperature of a medium having a heatable pressure chamber for the medium in the interior of a metal housing and this chamber can be viewed through oppositely disposed windows in the housing. The windows have flat panes which are maintained in pressure-tight relationship with respect to the housing and in parallel planes with respect to one another.

9 Claims, 2 Drawing Figures

PATENTED JUN 25 1974　　　　　　　　　　　　　　　　　3,818,614

APPARATUS FOR DEMONSTRATING THE CRITICAL TEMPERATURE OF A FLUID

BACKGROUND OF THE INVENTION

The present invention relates to apparatus used for demonstrating the critical temperature of a gas. In this type of apparatus a heatable pressure chamber is partially filled with a liquid medium and in order to demonstrate the critical temperature, the medium contained in the chamber is heated. When the critical temperature is reached, the separating line between liquid and gas disappears, i.e., the meniscus disappears.

Previously known apparatuses of this type employ glass housings. These have the serious drawback that they break very easily because of the high internal pressure produced in the heated chamber. Obviously this is dangerous for persons in the vicinity of the demonstration device. Furthermore, glass tubes, which are often used, are very poorly suited for use with other apparatus designed to project an image of the surface of the liquid onto a screen because distortions appear due to the circular shape of the tube. As a result it is often hard to discern the surface of the liquid.

SUMMARY OF THE INVENTION

Therefore, it is the object of the present invention to provide an improved apparatus for demonstrating the critical temperature of the type in which a heatable pressure chamber is partially filled with a medium which is liquid at room temperature, and which apparatus does not exhibit the drawbacks found in previously known apparatus. This is accomplished, according to the invention, by providing a metal housing for the pressure chamber and by disposing windows for viewing the chamber in oppositely disposed openings in the housing. Each of the windows has a flat glass pane carried in pressure-tight relationship within the opening, and the panes are mounted in parallel planes with respect to one another.

With such an apparatus for demonstrating the critical temperature the danger of the housing breaking is greatly reduced. Moreover, when the liquid level is projected onto a screen no distortions appear due to the face that the panes are in parallel planes and consequently the surface of the liquid can be clearly discerned.

Preferably the openings in the housing, in which the viewing windows are disposed, are provided with inner threads into which a ring with external threads, and designed to hold the panes, can be screwed. The panes themselves are preferably confined between two sealing rings, with the ring designed to face the pressure chamber being made of rubber and the ring designed to face away from this chamber being made of aluminum. Such a construction is simple and safe. The rubber seal may be so constructed, with respect to the bursting pressure of the glass panes, that it becomes loose before the bursting pressure of the glass panes has been reached. This is possible because the temperature corresponding to the bursting pressure of the glass panes lies substantially above the highest temperature at which the rubber seal will operate satisfactorily.

It is particularly advantageous for the housing to consist of a metal block of a suitable material, which is provided with a bore with the pressure chamber viewing windows being disposed in the openings of the bore. In such a metal block, channels for a suitable heating medium, and a blind bore for a thermometer, can be provided in a simple manner. This embodiment of the invention is very safe and can be charged with an internal pressure up to 150 atmospheres gauge.

The demonstration of the critical temperature can be made particularly clear if two floats are provided in the chamber with one of these floats having a density which is somewhat above the critical density of the liquid in the chamber, and the other float having a density which lies somewhat below the critical density of the liquid. In the vicinity of the critical temperature the heavier float will sink to the bottom and the lighter float will rise.

The floats are preferably made of glass foam with surfaces which have been polished in a flame. The weight of such floats depends on the size and number of their pores.

DESCRIPTION OF THE PREFERRED EMBODIMENTS

Figure 1:
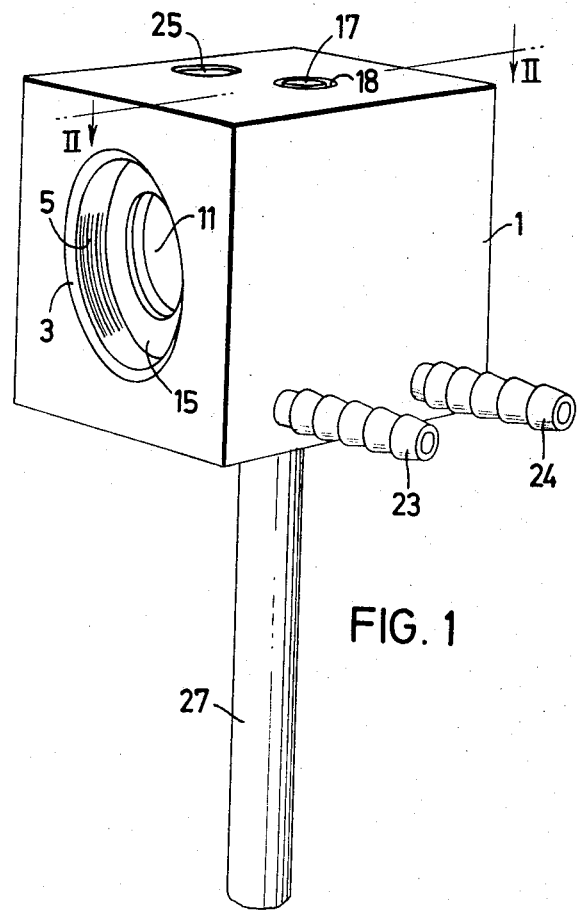
FIG. 1 is a perspective view of a preferred embodiment of the apparatus according to the present invention.
Figure 2:
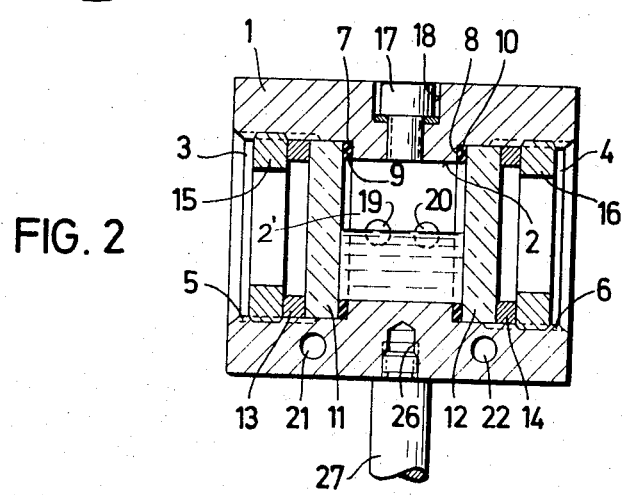
FIG. 2 is a sectional view taken along the line II—II in FIG. 1.

As shown in FIGS. 1 and 2, the housing 1 of the preferred embodiment of the apparatus according to the invention for demonstrating the critical temperature, consists of a metal block with a through bore 2. This bore 2 has a smaller diameter in the interior of the block than in the area of its two openings 3 and 4, and in these areas the bore 2 is provided with internal threads 5 and 6 respectively. Ledges 7 and 8 are formed by the different diameter of the bore 2 and within openings 3 and 4 there are disposed, one behind the other, rubber sealing rings 9 and 10, respectively, pressure-tight flat glass panes 11 and 12, respectively, and aluminum sealing rings 13 and 14, respectively. As seen in FIG. 2 the panes 11 and 12 and the sealing rings 13 and 14 are pressed onto the ledges 7 and 8 by metal rings 15 and 16, respectively, which have external threads so they can be screwed into openings 3 and 4, to produce a pressure tight seal. With this arrangement a chamber 2' is defined between the parallel glass panes 11 and 12 and the bore 2 in the vicinity of its smaller diameter.

The chamber 2' in the metal block of housing 1 is partially filled with a medium (for example, trifluoro-difluoro-chlorethane) which is in the form of liquid at the temperature of the room in which the apparatus is used. The chamber 2' is partially filled with the liquid through an opening 18 in the upper surface which is closed by a screw cap 17. Floats 19 and 20 rest on the surface of the liquid with one float having a density which is somewhat above the critical density of the liquid in the chamber 2' while the other float has a density which lies somewhat below the critical density of the liquid. As previously mentioned, these floats can be of glass foam.

In addition, channels 21 and 22 are provided in the metal block of the housing 1 for a conveying a heating medium through the block. This medium is fed into the channels 21 and 22 through terminals 23 and 24 respectively (FIG. 1). On the upper side of the metal block there is also provided a blind bore 25 for receiving a thermometer (not shown). The underside of the block of housing 1 is provided with a blind bore 26, having internal threading, for fastening a support rod 27 to the housing.

In order to demonstrate the critical temperature, the pressure chamber 2' which is partially filled with liquid is heated by passing an appropriate heating medium through channels 21 and 22 of the housing 1. The panes 11 and 12 provide for a direct visual observation of the surface of the liquid in chamber 2' or, if desired, suitable apparatus, utilizing a light beam which can be directed through the panes plane parallel 11 and 12, can be used to project a distortion free image of the surface of the liquid onto a screen. A thermometer inserted into bore 25 will show the value of the critical temperature for the liquid presently in the chamber.

It will be understood that the above description of the present application is susceptible to various modifications, changes and adaptations, and the same are intended to be comprehended within the meaning and range of equivalents of the appended claims.

I claim:

1. In an apparatus for demonstrating the critical temperature of a fluid including a sealed constant volume heatable pressure chamber partially filled with a preselected medium which is in the form of a liquid at room temperature the improvement wherein said pressure chamber comprises in combination:
   a. a metal housing having two oppositely disposed openings;
   b. two oppositely disposed pressure chamber viewing windows disposed respectively in said openings, said windows having flat panes; and,
   c. means for mounting said flat panes in pressure-tight relationship with respect to said housing and in parallel planes with respect to one another, whereby upon heating of said medium, the temperature at which the liquid level disappears, and hence the critical temperature of said medium, can be readily viewed via said viewing windows without distortion.

2. Apparatus as defined in claim 1, wherein said openings in said housing have internally threaded portions, and wherein said means for mounting includes externally threaded rings screwed into said portions to hold said panes.

3. Apparatus as defined in claim 2 wherein said means for mounting further includes a respective rubber sealing means between each said pane and said housing, and a respective aluminum sealing ring between each said pane and its associated said externally threaded ring.

4. Apparatus as defined in claim 1, wherein said housing consists of a metal block which has a through bore and said viewing windows are disposed in the openings of said bore.

5. Apparatus as defined in claim 4, wherein channels are provided in said metal block for circulating a heating medium through said block.

6. Apparatus as defined in claim 5, wherein said metal block has a blind bore in a surface thereof which is designed to receive a thermometer.

7. Apparatus as defined in claim 1, further comprising two floats in said pressure chamber, one of said floats having a density which lies somewhat above the critical density of the liquid contained in the pressure chamber and, the other of said floats having a density which lies somewhat below the critical density of the liquid.

8. Apparatus as defined in claim 7, wherein said floats consist of glass foam with flame polished surfaces.

9. Apparatus as defined in claim 1, wherein the liquid in the pressure chamber is trifluoro-difluoro-chlorethane.

* * * * *